(12) United States Patent
Jerg et al.

(10) Patent No.: US 8,734,592 B2
(45) Date of Patent: May 27, 2014

(54) DISHWASHER WITH A SORPTION DRIER AND METHOD FOR THE OPERATION THEREOF

(75) Inventors: Helmut Jerg, Giengen (DE); Kai Paintner, Welden (DE)

(73) Assignee: BSH Bosch und Siemens Hausgeraete, Munich (DE)

( * ) Notice: Subject to any disclaimer, the term of this patent is extended or adjusted under 35 U.S.C. 154(b) by 0 days.

(21) Appl. No.: 13/491,671

(22) Filed: Jun. 8, 2012

(65) Prior Publication Data

US 2012/0240962 A1 Sep. 27, 2012

Related U.S. Application Data

(63) Continuation of application No. 11/792,685, filed as application No. PCT/EP2005/055480 on Oct. 24, 2005, now abandoned.

(30) Foreign Application Priority Data

Dec. 9, 2004 (DE) .......................... 10 2004 059 422
Jan. 28, 2005 (DE) .......................... 10 2005 004 089

(51) Int. Cl.
*B08B 9/20* (2006.01)
(52) U.S. Cl.
USPC ........................................ 134/25.2; 134/56 D
(58) Field of Classification Search
USPC .............................. 134/18, 56 D, 57 D, 58 D
See application file for complete search history.

(56) References Cited

U.S. PATENT DOCUMENTS

| 3,026,628 | A |   | 3/1962 | Berger, Sr. et al. |
|---|---|---|---|---|
| 3,034,221 | A |   | 5/1962 | Tuck et al. |
| 4,534,955 | A | * | 8/1985 | Rosenbaum ............... 423/576.2 |
| 6,161,306 | A | * | 12/2000 | Clodic ............................ 34/321 |
| 6,434,857 | B1 |   | 8/2002 | Anderson et al. |
| 2006/0278257 | A1 |   | 12/2006 | Jerg et al. |
| 2007/0101609 | A1 |   | 5/2007 | Jerg et al. |

FOREIGN PATENT DOCUMENTS

| DE | 2016831 A1 | 10/1971 |
|---|---|---|
| DE | 3626887 A1 | 2/1988 |
| DE | 10058188 A1 | 5/2002 |
| EP | 0358279 A1 | 3/1990 |
| EP | 0777998 A1 | 6/1997 |

(Continued)

OTHER PUBLICATIONS

Machine Translation of Meynberg, DE 3626887 A1, Feb. 1988.*

(Continued)

*Primary Examiner* — David Cormier
(74) *Attorney, Agent, or Firm* — James E. Howard; Andre Pallapies

(57) ABSTRACT

A method is provided for operating a dishwasher with at least one partial program step that includes heating a rinsing solution to a nominal temperature. Air that is heated by a heating device and used for desorption of a reversibly dehydratable material is conducted from a washing container of the dishwasher or ambient air is conducted through a sorption column with reversibly dehydratable material into the washing container in order to heat the rinsing solution and/or items to be washed. The heating device continues to operate after the desorbed state of the reversibly dehydratable material has been attained until the nominal temperature of the rinsing solution is reached.

15 Claims, 3 Drawing Sheets

(56) References Cited

FOREIGN PATENT DOCUMENTS

| JP | 01005521 A | * | 1/1989 |
| JP | 08224201 A | * | 9/1996 |
| JP | 2001087203 A | * | 4/2001 |
| JP | 2006020753 A | | 1/2006 |
| WO | 9833427 A1 | | 8/1998 |

OTHER PUBLICATIONS

Machine Translation of Sumida, JP 08-224201 A, Sep. 1996.*
Machine Translation of Saito et al., JP 2001-087203, Apr. 2001.*
International Search Report PCT/EP/2005/055480.
National Search Report DE 10 2005 004 089.6.

* cited by examiner

DISHWASHER WITH A SORPTION DRIER AND METHOD FOR THE OPERATION THEREOF

CROSS-REFERENCE TO RELATED APPLICATIONS

This application is a continuation, under 35 U.S.C. §120, of U.S. application Ser. No. 11/792,685, filed Jun. 7, 2007, which is a U.S. national stage application under 35 U.S.C. §371 of PCT/EP2005/055480, filed Oct. 24, 2005, which designated the United States; this application also claims the priority, under 35 U.S.C. §119, to German Application No. 10 2004 059 422.8, filed Dec. 9, 2004, and to German Application No. 10 2005 004 089.6, filed Jan. 28, 2005.

BACKGROUND OF THE INVENTION

The invention relates to a dishwasher with a sorption drier. The invention also relates to a method for operating a dishwasher with at least one partial programme step with rinsing liquor that is to be heated to a nominal temperature, e.g. "Clean", wherein air that is heated in this partial programme step by a heating device and is used for desorption of a reversibly dehydratable material and/or ambient air is conducted from a rinsing container of the dishwasher by a sorption column with reversibly dehydratable material into the rinsing container in order to heat the rinsing liquor and/or items to be washed.

As is well known, conventional dishwashers have a washing process whose programme sequence generally consists of at least one "Prewash" partial programme step, a "Clean" partial programme step, at least one "Intermediate Wash" partial programme step, a "Clear Wash" partial programme step and a "Drying" partial programme step. In order to increase the cleaning effect the rinsing liquor is in this case heated before or during a partial programme step. The rinsing liquor is normally heated by means of electric heating devices. Different drying systems are known for drying the items to be washed in a dishwasher.

A dishwasher of the type just mentioned is disclosed in DE 20 16 831, in which the air is conducted from the rinsing container via a sealable opening in the wall of the rinsing container on reversibly dehydratable material and from there via an opening to the outside. The desorption of the reversibly dehydratable material takes place during the non-operating phase of the dishwasher, the water vapour formed thereby being conducted to the outside via the opening. The dishwasher described is disadvantageous from the energy viewpoint because the regeneration of the reversibly dehydratable material takes place during a non-operating phase of the dishwasher, i.e. at a time when none of the partial programme steps already described is being carried out. A further disadvantage consists in the fact that the possibility of damage to the surrounding kitchen furniture cannot be ruled out because of the discharge of the water vapour formed during the regeneration of the reversibly dehydratable material to the outside. In this case the regeneration is associated with an additional energy requirement which is added to the energy required during the partial programme steps.

In order to minimise the energy expenditure when operating a dishwasher, DE 103 53 774.0 of the applicant discloses a dishwasher with a rinsing container and devices for washing dishes by means of rinsing liquor, which dishwasher has a sorption column connected in an air-conducting manner to the rinsing container and containing reversibly dehydratable material, wherein on the one hand the sorption column is used to dry the dishes and on the other hand the thermal energy used for desorption of the sorption column is at least partially used for heating the rinsing liquor and/or the dishes.

To solve this same problem DE 103 53 775.9 of the applicant proposes, for operating a dishwasher, to conduct air in the at least one "Drying" partial programme step from a rinsing container and/or from ambient air through a sorption column and into the rinsing container, the sorption column containing reversibly dehydratable material and moisture being extracted from the air during its passage.

Heating of the items to be processed is normally no longer necessary in the partial programme step preceding the "Drying" partial programme step due to the use of reversibly dehydratable material with a hygroscopic property, e.g. zeolith. This allows a considerable energy saving.

EP 0 358 279 B1 discloses a device for drying dishes in a domestic dishwasher in which the rinsing liquor is heated by a heater arranged outside the rinsing container, preferably an electric geyser, a largely closed drying system being provided here in which air circulates from the rinsing container via a drying device that can be regenerated by heating and from this device back into the rinsing container. Here the drying device consists of a drying container in thermal contact with the heater, which container is filled with a drying means adsorbing the moisture. Because the drying container is connected to the heater provided in any case for heating the rinsing liquor, the drying device is immediately operational after completion of the rinsing process. The drying means is in this case placed at least partially around the heating elements as a jacket so that the drying means can be heated and hence dried in the drying container during each heating process.

The drying container is designed as a double-wall hollow cylinder into which the drying material is introduced. The inlet and outlet opening for connection to the closed air system are arranged diagonally opposite one another. The disadvantage of this is that it gives rise to a relatively flow resistance, with the result that the fan provided for conveying the air flow must be operated at very high power. This has a negative effect in terms of noise development and energy consumption.

Because of the structural design of the sorption drier, which requires inhomogeneous introduction of heat into the drying material, the desorption is time consuming and may also lead to local overheating of the drying means and hence to its irreversible damage. The desorption is also difficult because the heater is arranged in the centre of the double-wall hollow cylinder and radial distribution of heat to the drying means close to the outer hollow cylinder wall is hardly possible because of the air flowing axially past it.

BRIEF SUMMARY OF THE INVENTION

The object of this invention is therefore to provide a method for operating a dishwasher and a dishwasher, particularly a domestic dishwasher, with which it is possible to shorten the length of a rinsing programme with a plurality of partial programme steps.

This object is achieved by the method according to the exemplary embodiments described herein. Advantageous further developments of this invention are described with reference to the exemplary embodiments.

In the method according to the invention for operating a dishwasher, in particular a domestic dishwasher, with at least one partial program step with rinsing liquor that can be heated to a nominal temperature, e.g. "Clean", where air heated in this partial programme step by a heating device for desorption of a reversibly dehydratable material is conducted from a rinsing container of the dishwasher and/or ambient air is conducted through a sorption column with reversibly dehydratable material into the rinsing container for heating the rinsing liquor and/or the items to be washed, the heating device continues to operate after a desorbed condition of the reversibly dehydratable material is attained until the nominal temperature of the rinsing liquor is reached.

The term desorbed condition of the reversibly dehydratable material is understood in this invention to mean that the reversibly dehydratable material is completely or almost completely dehumidified.

In other words this means that the rinsing liquor is not heated by a conventionally designed (water) heating device but that the energy expended for the desorption is used during a partial programme step with rinsing liquor to be heated for heating the rinsing liquor. However, desorption is normally fully completed at a time when the rinsing liquor has not yet been brought to the required nominal temperature. The invention therefore proposes continuing to operate the (air) heating device used for the desorption so that air is heated in the sorption drier and fed to the rinsing container. Because of the introduction of hot air into the rinsing container the rinsing liquor and/or the items to be washed continue to be heated until the nominal temperature of the rinsing liquor is reached. Since very high temperatures are reached during the desorption process in the sorption drier, more precisely in the sorption column, the rinsing liquor is heated very quickly.

According to a suitable design the desorbed moisture is fed to the rinsing container. During the desorption process, which takes place during a partial programme step with rinsing liquor to be heated, the reversibly dehydratable material for desorption is heated to very high temperatures. Here the stored liquid escapes as hot water vapour. Because the fan is operating the water vapour is introduced into a rinsing container of the dishwasher and the air in the rinsing container is therefore also heated. The introduction of the hot water vapour and the heated air into the rinsing container (rinsing container) is sufficient to heat the rinsing liquor and/or the dishes to such a temperature that the difference until the nominal temperature is reached can be attained by continuing to operate the sorption drier.

In a further suitable design provision may also be made for an additional heating device to be operated for heating the rinsing liquor before and/or after the desorbed condition of the reversibly dehydratable material is attained. This shortens the heating time and therefore reduces the duration of the partial programme step for the rinsing liquor to be heated.

The additional heating device is suitably arranged in the rinsing liquor circuit and heats the rinsing liquor directly. In other words this means that the additional heating device is designed as a water heating device, but compared to a classic heating device, such as that described in EP 0 358 279 B1, for example, it can be dimensioned much smaller. The additional heating device may alternatively also be designed as an air heating device in the circuit of the sorption drier.

In a further advantageous design the air is passed through a fan that can be operated at a variable speed, the speed of the fan being established according to a desired duration of the partial programme step. According to an advantageous design a dishwasher can be operated during the partial programme step with rinsing liquor to be heated at a constant, low and hence noise-optimised speed. On the other hand it is possible to increase the speed of a controlled fan so that the heating process for the rinsing liquor is accelerated. Such a time-reduced rinsing programme is in this case accompanied by increased operating noise. It is therefore advantageous for the speed of the fan to be selected in a plurality of stages by a control element of the dishwasher. In other words a function can be provided in the control element of the dishwasher which enables the user to select a "Fast Rinse Programme" actively, which means that the user then actively opts for increased noise development.

A dishwasher according to the invention has the same advantages as those disclosed in connection with the above method.

In a dishwasher designed according to the invention, particularly a domestic dishwasher, with a rinsing container and devices for rinsing items to be washed by means of rinsing liquor, and with a sorption drier having a sorption column connected in an air-conducting manner to the rinsing container and containing dehydratable material, where on the one hand the sorption column is used to dry the dishes and on the other hand the thermal energy used for desorption of the sorption column is used for heating the rinsing liquor in the rinsing container and/or the items to be washed, the rinsing liquor can be heated to the nominal temperature required in the partial programme step concerned by means of the sorption drier.

One advantage of this lies in the fact that this allows a very simple structure for such a dishwasher since it is possible to dispense with a classic (water) heating device. In principle the dishwasher may be designed as described in DE 103 53 774 and/or DE 103 53 775 of the applicant, whose contents are incorporated in this application where appropriate. The machine described here is distinguished by its control system and the operation of the sorption drier and/or by the design of the components of the sorption drier, since the latter continues to be operated by pure dehydration of the sorption column until the nominal temperature of the rinsing liquid is reached. In the case of a dishwasher according to the invention the main control for achieving the desired operation and/or the power of the heating device and fan, as well as the volume of the sorption column are modified, e.g. in terms of their geometric design, and are matched to each other so that a further increase in the temperature of the rinsing liquor is possible merely by operating the heating device and the fan.

According to a preferred feature air is conducted from the rinsing container and/or from the ambient air during a partial programme step with rinsing liquor to be heated, preferably during the "Clean" and/or "Prewash" and/or "Clear Rinse" partial programme step through the sorption column and into the rinsing container.

According to a further preferred feature the rinsing container has an outlet with a pipe to the sorption column, wherein the pipe is preferably provided with a shutoff valve and, in the direction of flow, then preferably an inlet valve for the ambient air, and the rinsing container has an inlet with a pipe from the sorption column, a fan being arranged in the pipe to the sorption column which introduces at least some of the air in the rinsing container or from the ambient air of the sorption column, at least temporarily. In a preferably closed air system the possibility of exchange of contaminated air from the atmosphere is completely excluded, thereby preventing recontamination of the items to be washed. The fan can easily be activated so that the use of the sorption column can be precisely controlled.

An electric heating device is suitably arranged for desorption of the reversibly dehydratable material and for heating the rinsing liquor and/or the items to be washed. This device is preferably arranged in the reversibly dehydratable material or in the pipe to the sorption column.

It is also appropriate for the fan of the sorption drier is designed so that it can be speed-controlled by a main control unit of the dishwasher in order to be able to control the rate of heating of the temperature of the rinsing liquor and/or the items to be washed. The speed of the fan may in this case be selected preferably steplessly or in a plurality of stages by a control element of the dishwasher.

BRIEF DESCRIPTION OF THE DRAWINGS

The invention is explained in greater detail in the following by way of the exemplary embodiment of a method in a dishwasher represented in FIGS. 1-3.

DETAILED DESCRIPTION OF EXEMPLARY EMBODIMENTS OF THE PRESENT INVENTION

The method according to the invention for operating a dishwasher with at least one partial programme step with rinsing liquor to be heated to a nominal temperature and/or with at least one "Drying" partial programme step is implemented in the exemplary example described in a dishwasher which is constructed schematically, as described in DE 103 53 774 and/or DE 103 53 775 of the applicant. As is well known a dishwasher has a rinsing process whose programme sequence generally consists of at least one "Prewash" partial programme step V, a "Clean" partial programme step R, at least one "Intermediate Wash" partial program step Z, a "Clear Rinse" partial programme step K and a "Drying" partial programme step T. The drying is preferably carried out in the exemplary embodiment as described in DE 103 53 774 and/or DE 103 53 775, the contents of which are incorporated in this application, if appropriate. Here the figure shows a typical temperature curve of the rinsing liquor during these partial programme steps. The figure also shows both the operation in a conventional dishwasher and operation according to the method according to the invention.

The "Prewash" partial programme step V and the "Intermediate Wash" partial programme step Z are of subordinate importance for the methods according to the invention, with the result that they are not considered in detail in the following description. At the beginning of the "Clean" partial programme step R the rinsing liquor is normally heated to a nominal temperature $T_{nenn}$ in order to achieve the desired cleaning effect. In an energy-optimised dishwasher with a sorption drier, as already known from the state of the art, the desorption, i.e. the heating of the reversibly dehydratable material, also takes place during the "Clean" partial programme step R. The contents of DE 103 53 774 and/or DE 103 53 775 are incorporated in this application, if appropriate.

Figure 1:
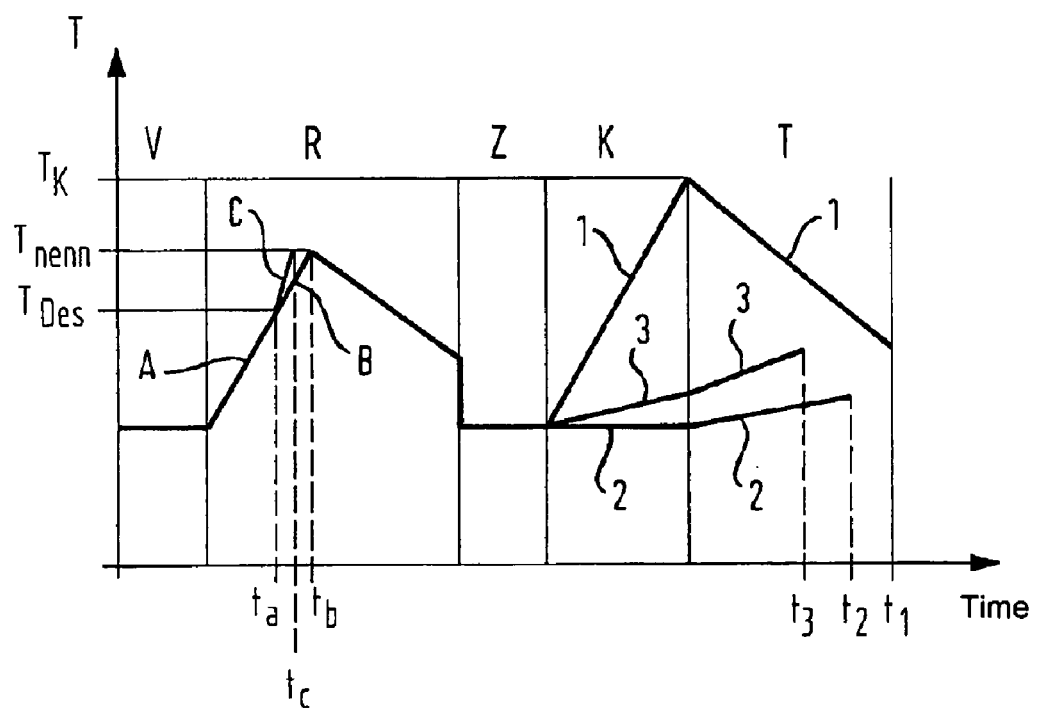
Figure 2:
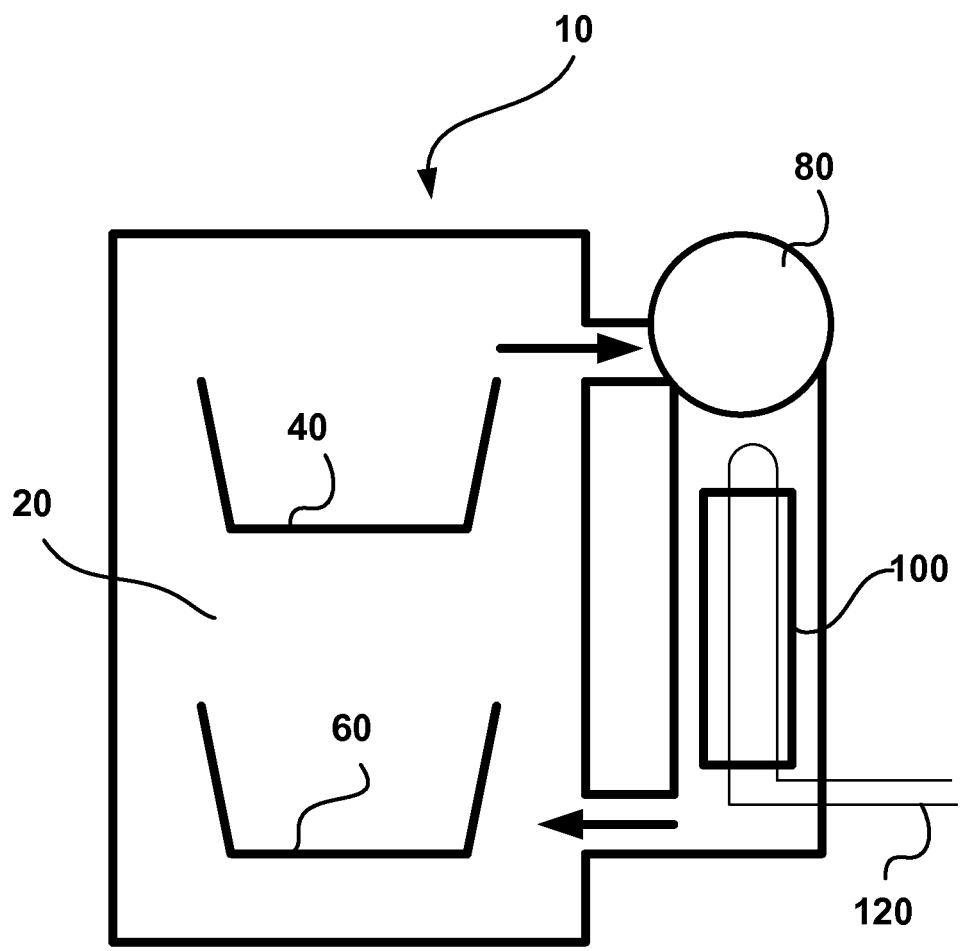
FIGS. 2 and 3 are schematic illustrations of the disclosed exemplary embodiments.
Figure 3:
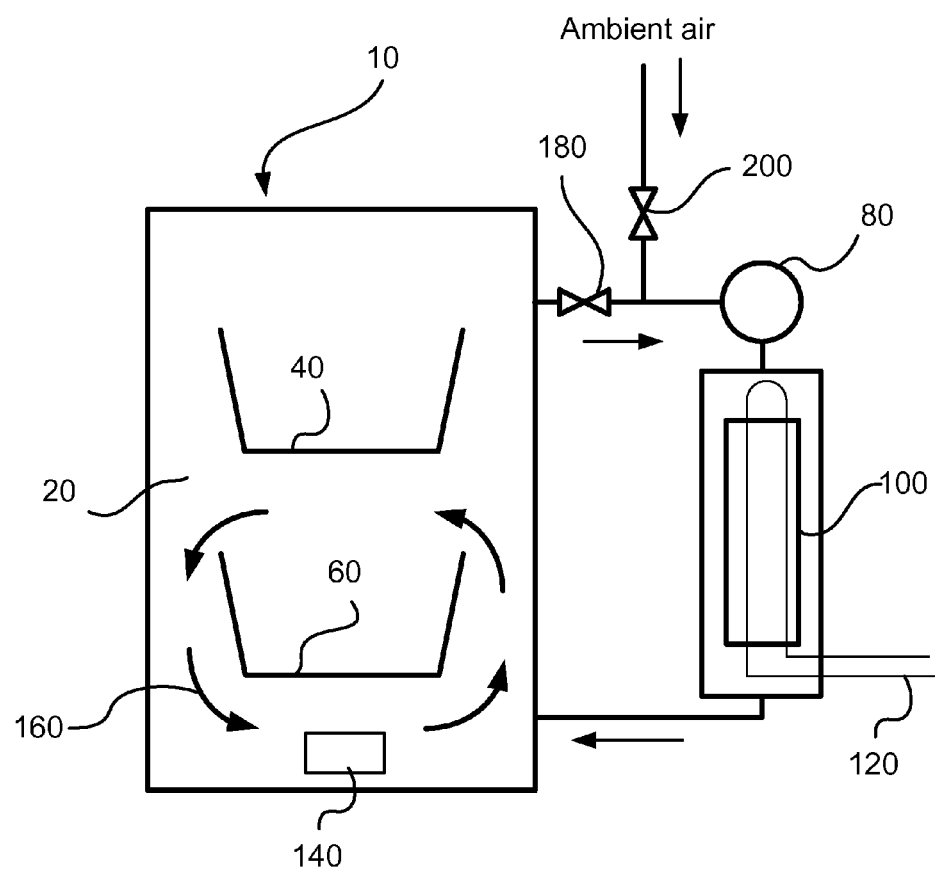

The dishwashing machine 10 includes a rinsing container (e.g., washing container) 20, and a device (e.g., 40, 60) for washing crockery using rinsing solution. In order to heat the rinsing liquor it is now heated, according to the invention, not directly by a water heating device but use is made of the energy required for the desorption. For this purpose an (air) heating device 120 arranged in the sorption drier, which contains the reversibly dehydratable material 100, e.g. zeolith, is heated to a high temperature. During the desorption of the reversibly dehydratable material 100, air is conducted from a rinsing container 20, e.g. with an outlet, through the sorption column and then back into the rinsing container 20 via an inlet, the air being heated by the heating device during its passage. In this case the air is sucked out of the rinsing container 20 by means of a fan 80 and forced through the sorption column The hot water vapour escaping from the sorption column and the air, now heated, enter the rinsing container 20 through the inlet already mentioned and therefore meet the circulated rinsing liquor (rinsing liquor circuit 160 is schematically shown in FIG. 3) and/or the dishes, which are heated thereby. According to a further feature, the rinsing container 20 has an outlet with a pipe to the sorption column, wherein the pipe is preferably provided with a shut-off valve 180 and, in the direction of flow, then preferably an inlet valve 200 for the ambient air, and the rinsing container 20 has an inlet with a pipe from the sorption column, the fan 80 being arranged in the pipe to the sorption column which introduces at least some of the air in the rinsing container or from the ambient air of the sorption column, at least temporarily.

The sorption drier is normally operated only until the reversibly dehydratable material is fully desorbed, i.e. dehumidified (Section A in the figure). In the exemplary embodiment shown in the figure, this condition is reached at a time $t_a$ when the rinsing liquor and/or the items to be washed have reached a temperature $T_{Des}$. This temperature is normally below the nominal temperature $T_{nenn}$, to be achieved. To bridge this temperature difference the heating device and the fan of the sorption drier now continue to be operated according to the invention, and hot air is conveyed to the rinsing container, until the circulated rinsing liquor and/or the items to be washed reach the desired nominal temperature (Section B). This condition is reached with suitable dimensioning of the sorption drier, in particular the power of the heating device, the speed of the fan and the arrangement and geometry of the sorption column at a time $t_b$.

The method according to the invention enables a dishwasher to be provided which may therefore dispense completely with a water heating device. The rinsing liquor is heated advantageously in all partial programme steps by the air heating of the sorption drier that is of a very simple structure and can therefore be manufactured at low cost.

To enable the "Clean" partial programme step R to be carried out more quickly, i.e. in order to be able reach the desired nominal temperature $T_{nenn}$, an additional heating device 140 may be provided according to another variant of the invention, which device heats the rinsing liquor during Section A and/or during section B to increase the temperature from $T_{Des}$ to $T_{nenn}$, so that nominal temperature $T_{nenn}$ is already reached at time $t_c$ (Section C). The additional heating device 140 may optionally be designed as a water heating device, e.g. a geyser, or as an air heating device inserted in the air circuit. In both cases the additional heating device 140 can be dimensioned so that only a low heating power need be made available that is capable of bridging the missing temperature difference between $T_{Des}$ to $T_{nenn}$. Not shown in the figure, but quite obvious to a person skilled in the art, is the fact that regardless of the time when the nominal temperature $T_{nenn}$ (in the exemplary embodiment $t_b$ or $t_c$) is reached, the heating phase of the rinsing liquor is completed, resulting in a reduction in the processing temperature by the end of the "Clean" partial programme step R. The extent to which the processing temperature falls and the duration of this fall depend on the type of cleaning programme carried out and on the insulating characteristics of the dishwasher.

According to a further variant provision may also be made for the speed of the fan of the sorption drier to be increased during the "Clean" partial programme step R in order to achieve a further reduction in the time until the nominal temperature $T_{nenn}$ is reached. This could be provided so that it can be pre-elected by the user of the dishwasher, e.g. by means of a control element.

In conventional dishwashers the items to be washed are dried by so-called intrinsic heat drying in the "Clear rinse" and "Drying" partial programme steps (Section 1). Here the rinsing liquor is heated in the "Clear rinse" partial programme step, as a result of which the items to be washed, clearly hot rinsed by the intrinsic heat of the items to be washed thus developed, are automatically dried during the drying process. To achieve this intrinsic heat drying the rinsing liquor is therefore heated in the "Clear rinse" partial programme step to temperature $T_K$ and applied to the items to be washed by spraying devices. Because of the relatively high temperature of the rinsing liquor in the "Clear rinse" partial programme step, normally ranging from 65° C. to 75° C., a sufficiently quantity of heat is transferred to the items to be washed so that the water adhering to the items to be washed evaporates due to the heat stored in the items to be washed.

A considerable energy saving is achieved by the use of sorption driers because heating of the rinsing liquor in the "Clear rinse" partial programme step K is not necessary in principle in these devices (Section 2), but can nevertheless be carried out to a small extent (Section 3). The drying is achieved in that air is conducted in the "Drying" partial programme step from the rinsing container and/or from ambient air through the sorption column into the rinsing container, the sorption column containing the reversibly dehydratable material extracting moisture from the air during its passage. Because of the use of reversibly dehydratable material with a hygroscopic property, e.g. zeolith, heating of the items to be processed is not normally necessary in the partial programme step preceding the "Drying" partial programme step (Section 2), but heating to low temperatures, e.g. up to 30° C., can still be carried out during "Clear rinsing" (Section 3). Due to heating of the air by means of the sorption column, in which the condensation heat of the water vapour is released, its moisture absorptivity is increased during each passage through the sorption column, which results in an improvement in the drying result and to a shortening of the drying time. Additional heating of the air with a supplementary heating device in the "Drying" partial programme step, besides heating with the sorption column, and hence also heating of the dishes in dishwashers, for example, is not normally required because the thermal energy released in the sorption column is sufficient to heat the air to high temperatures, e.g. 70° C. The sorption column itself is heated by the condensation heat to temperatures of up to 160° C., for example.

An acceleration of the drying process, which in conventional dishwashers takes place by means of a time programme control system and lasts until time $t_1$, can be achieved by providing the fan whose speed can be controlled steplessly or in a plurality of stages in the sorption drier. The adsorption process is accelerated by the increase in speed, resulting in a shortening of the drying time.

If increasing the temperature during the "Clear rinse" partial programme step is dispensed with, drying can be terminated as early as time $t_2$ (Section 2). A further reduction in drying time is achieved by the heating of the clear rinse temperature described above (Section 3), enabling drying to be completed at time $t_3$. Here it must be assumed that the drying efficiency and degree of drying of the items to be dried are identical in all three variants.

Since the increase in the speed of the fan of the sorption drier is accompanied by increased noise radiation, it is advantageous to have this mode of operation carried out actively by a user of the dishwasher. This cold achieved, for example, by providing a suitable control element which is connected to a main control system of the dishwasher and a suitable mode of operation.

This invention provides a method with which it is possible to operate a dishwasher of the type mentioned economically and to minimise the associated energy expenditure in a time-optimised manner.

What is claimed is:

1. A dishwasher comprising:
   a washing container;
   a washing device for washing crockery during a partial program step of a washing process using a rinsing solution in the washing container;
   a sorption drying device in communication with the washing container such that air passes between the washing container and the sorption drying device, the sorption drying device having a housing containing reversibly dehydratable material that withdraws moisture from the air during passage of the air through the sorption drying device, the housing being coupled at a first end to an air outlet of the washing container and at a second end to an air inlet of the washing container, the housing having walls that guide the air along a flow path from the air outlet of the washing container through the reversibly dehydratable material and into the air inlet of the washing container;
   a fan that conveys the air along the flow path from the air outlet of the washing container through the reversibly dehydratable material and into the air inlet of the washing container;
   a heating element disposed inside the walls of the housing of the sorption drying device and in the flow path of the air; and
   a control unit programmed to control an operation of the washing device, the fan, and the heating element during the partial program step of the washing process to desorp the reversibly dehydratable material of the sorption drying device and to heat the rinsing solution that is disposed in the washing container using the air that is heated by the heating element and that passes along the flow path through the sorption drying device and into the air inlet of the washing container,
   wherein, during the partial program step of the washing process, the control unit is programmed to continue to operate the heating element after a desorbed condition of the reversibly dehydratable material is attained to continue to heat the rinsing solution that is disposed in the washing container using the air that is heated by the heating element and that passes along the flow path through the sorption drying device and into the air inlet of the washing container until a temperature of the rinsing solution disposed in the washing container is equal to a desired nominal temperature of the rinsing solution for the partial program step of the washing process.

2. The dishwasher of claim 1, wherein the heating element is disposed inside the walls of the housing of the sorption drying device, in the flow path of the air, and upstream of the reversibly dehydratable material.

3. The dishwasher of claim 1, wherein the heating element is disposed inside the walls of the housing of the sorption drying device, in the flow path of the air, and is embedded in the reversibly dehydratable material.

4. The dishwasher of claim 1, wherein a first pipe couples the air outlet of the washing container to the first end of the housing of the sorption device, the first pipe including a shutoff valve and an inlet valve for admitting ambient air into the flow path and in a direction of the flow path.

5. The dishwasher of claim 4, wherein the fan is arranged in the first pipe.

6. The dishwasher of claim 4, wherein a second pipe couples the air inlet of the washing container to the second end of the housing of the sorption device.

7. The dishwasher of claim 1, wherein the heating element is an electric heating device.

8. The dishwasher of claim 1, wherein the control unit is programmed to control a speed of the fan.

9. The dishwasher of claim 8, wherein the control unit is programmed to control the speed of the fan steplessly or in a plurality of stages.

10. The dishwasher of claim 1, wherein the control unit is programmed to control the operation of the washing device, the fan, and the heating element to withdraw moisture from the air during the passage of the air along the flow path from the air outlet of the washing container through the reversibly dehydratable material and into the air inlet of the washing container such that the crockery in the washing container is dried.

11. The dishwasher of claim 1, wherein the control unit is programmed to control the operation of the washing device, the fan, and the heating element such that the air is conveyed from at least one of the washing container and an ambient air source and passes through the reversibly dehydratable material and into the air inlet of the washing container during a partial program step with the rinsing solution.

12. The dishwasher of claim 11, wherein the partial program step includes one of a "Clean" partial program step, a "Prewash" partial program step, and a "Clear rinse" partial program step.

13. A method for treating crockery disposed in a dishwasher, wherein the dishwasher comprises:
   a washing container;
   a washing device for washing the crockery during a partial program step of a washing process using a rinsing solution in the washing container;
   a sorption drying device in communication with the washing container such that air passes between the washing container and the sorption drying device, the sorption drying device having a housing containing reversibly dehydratable material that withdraws moisture from the air during passage of the air through the sorption drying device, the housing being coupled at a first end to an air outlet of the washing container and at a second end to an air inlet of the washing container, the housing having walls that guide the air along a flow path from the air outlet of the washing container through the reversibly dehydratable material and into the air inlet of the washing container;
   a fan that conveys the air along the flow path from the air outlet of the washing container through the reversibly dehydratable material and into the air inlet of the washing container;
   a heating element disposed inside the walls of the housing of the sorption drying device and in the flow path of the air; and
   a control unit programmed to control an operation of the washing device, the fan, and the heating element during the partial program step of the washing process to desorp the reversibly dehydratable material of the sorption drying device and to heat the rinsing solution that is disposed in the washing container using the air that is heated by the heating element and that passes along the flow path through the sorption drying device and into the air inlet of the washing container,
   wherein, during the partial program step of the washing process, the control unit is programmed to continue to operate the heating element after a desorbed condition of the reversibly dehydratable material is attained to continue to heat the rinsing solution that is disposed in the washing container using the air that is heated by the heating element and that passes along the flow path through the sorption drying device and into the air inlet of the washing container until a temperature of the rinsing solution disposed in the washing container is equal to a desired nominal temperature of the rinsing solution for the partial program step of the washing process,
   the method comprising:
   subjecting the crockery to the partial program step of the washing process including at least one of a washing step, a rinsing step, and a drying step;
   conveying the air, by operating the fan, along the flow path from the air outlet of the washing container through the reversibly dehydratable material, which withdraws moisture from the air, and into the air inlet of the washing container and into contact with the crockery during the at least one of the washing step, the rinsing step, and the drying step;
   heating the reversibly dehydratable material with the heating element to desorp the reversibly dehydratable material and achieve a desorbed condition of the reversibly dehydratable material;
   heating the rinsing solution until a temperature of the rinsing solution is equal to a desired nominal temperature during the at least one of the washing step, the rinsing step, and the drying step, by continuing to operate the heating element, after the desorbed condition of the reversibly dehydratable material is achieved, to heat the air that passes along the flow path through the sorption drying device and into the air inlet of the washing container and into contact with the crockery.

14. The method claim 13, further comprising operating an additional heating device for heating the rinsing solution during at least one of before and after the desorbed condition of the reversibly dehydratable material is attained.

15. The method claim 14, wherein the operating the additional heating element for heating the rinsing solution includes operating an additional heating device arranged in a rinsing solution circuit such that the rinsing solution is heated directly by the additional heating device.

* * * * *